April 16, 1929.  O. L. KOESTER  1,709,436
FISH LINE WRINGER
Filed March 12, 1928
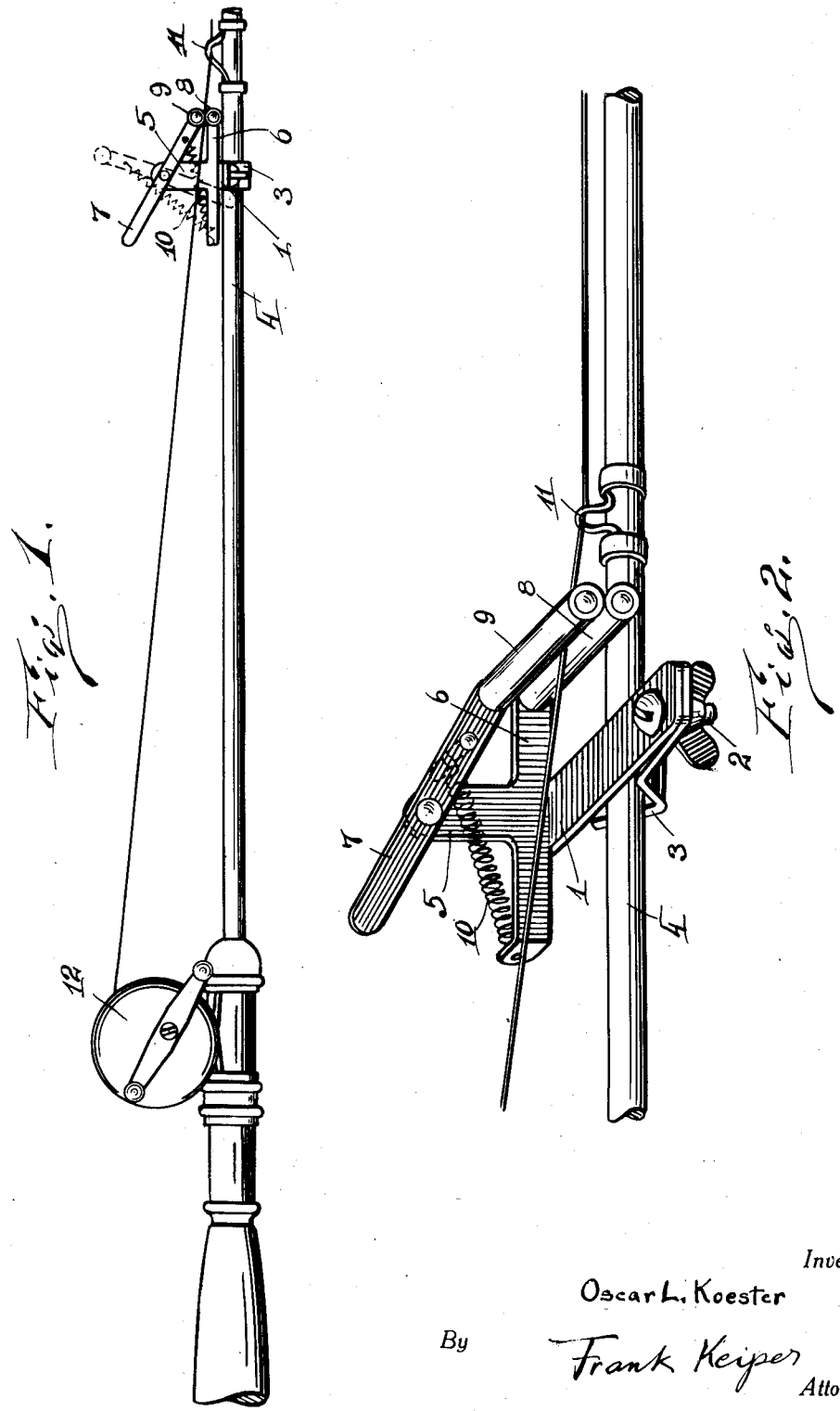
Inventor
Oscar L. Koester
By Frank Keiper
Attorney Patented Apr. 16, 1929.

1,709,436

UNITED STATES PATENT OFFICE.

OSCAR L. KOESTER, OF ROCHESTER, NEW YORK.

FISHLINE WRINGER.

Application filed March 12, 1928. Serial No. 260,839.

The object of this invention is to provide a wringer as an attachment for fish poles by means of which the fish line has most of the water wrung out of it as it is being pulled in, and before it is wound up on the reel.

This and other objects of this invention will be fully illustrated in the drawing, described in the specification and pointed out in the claims at the end thereof.

In the accompanying drawing:

Figure 1 is a side elevation of a portion of a fish pole having the fish line wringer attached thereto in connection with a fish line reel.

Figure 2 is an enlarged perspective view of the fish line wringer and a portion of the fish pole to which it is attached.

In the figures of the drawing like reference numerals indicate like parts.

In fishing, the fish line absorbs a considerable amount of water which drips from the line as it is being pulled in and wound up on the reel. This is objectionable because it keeps the hands and other parts of the body wet as the water drips on them and it is further objectionable because the water also drips into the winding mechanism of the reel on which the line is wound and causes corrosion of the mechanism of the reel which in due time makes the reel useless.

The wringer attachment forming the subject matter of this invention prevents this as the water soaked up in the line is squeezed out of the line as it is being pulled in. This is done at a point on the fish pole where the water thus forced out of the line cannot drip onto the hands and body of the fisherman or into the reel mechanism.

As illustrated in the figures of the drawing, the wringer attachment comprises a frame made up of a horizontal member 1 to the under side of which is fastened by means of the clamping bolt 2, a clamping member 3. The clamping member is provided with a V shaped channel that partially encircles the under side of the fish pole 4 so that when the clamping member is drawn up against the under side of the horizontal bar or member 1 it will clamp itself and the horizontal bar in place on the fish pole. On one side of the horizontal member is provided the upright 5 and the fixed arm 6. On top of the upright member 5 is mounted to swing a second arm 7. Both the fixed arm 6 and the swinging arm 7 have a rubber roller 8 and 9 respectively mounted to rotate on the outer end thereof. These rollers project horizontally over the fish pole and parallel to the horizontal member 1. The roller 9 carried on the outer end of the swinging arm 7 is yieldingly held in contact with the roller carried by the fixed arm 6 by means of the tension spring 10 which is stretched between the end of the arm 6 and a suitable point on the arm 7. The tension spring 10 holds these rollers in contact with each other with sufficient pressure so that a fish line passing between the rollers will have all or nearly all of the water squeezed out of it.

When it is desired to open the rollers, the swinging lever 7 is swung into the dotted line position illustrated in Figure 1 in which position the spring 10 holds the roller 9 of the lever 7 in a raised position out of contact with the roller 8, while the opposite end of the lever 7 is held against the horizontal member 1. As illustrated in Figure 1 the wringer attachment is fastened to the pole 4 at a point close to the first guide loop 11 of the fish pole. In this position the line passes thru the rollers with the line passing from the loop in a direct line to the reel 12. The line in passing thru between the wringer rollers 8 and 9 is thus not deflected so that a minimum pressure of the roller 9 against the roller 8 will squeeze the water out of the line as it passes thru between them.

I claim:

1. A fish line wringer for fishing poles comprising a fixed and a swinging roller, means for yieldingly holding said swinging roller in contact with said fixed roller.

2. A fish line wringer for fishing poles comprising a fixed and a swinging roller, means for yieldingly holding said swinging roller in contact with said fixed roller, and means for mounting said pair of rollers on a fish pole.

3. A fish line wringer for fishing poles comprising a frame, means for fastening said frame to a fishing pole, an upright provided on said frame, a fixed arm projecting to either side of said upright, an arm mounted to swing on said upright, a roller mounted to rotate at the outer end of said fixed arm and a roller mounted to rotate on the outer end of said swinging arm, and means for yieldingly holding said roller carried by said swinging arm in contact with said roller carried by said fixed arm.

4. A fish line wringer for fishing poles comprising a frame, means for fastening said frame to a fishing pole, an upright provided on said frame, a fixed arm projecting to either side of said upright, an arm mounted to swing on said upright, a roller mounted to rotate at the outer end of said fixed arm and a roller mounted to rotate on the outer end of said swinging arm, and means for yieldingly holding said roller carried by said swinging arm in contact with said roller carried by said fixed arm, and means for holding the roller carried by said swinging arm out of contact with the roller carried by said fixed arm.

In testimony whereof I affix my signature.

OSCAR L. KOESTER.